(12) United States Patent
Eitan et al.

(10) Patent No.: US 10,491,283 B2
(45) Date of Patent: Nov. 26, 2019

(54) WIDE TRANSMIT SECTOR LEVEL SWEEP (SLS) SECTORS

(71) Applicant: QUALCOMM Incorporated, San Diego, CA (US)

(72) Inventors: Alecsander Petru Eitan, Haifa (IL); Amichai Sanderovich, Atlit (IL); Assaf Yaakov Kasher, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/864,585

(22) Filed: Jan. 8, 2018

(65) Prior Publication Data

US 2018/0198505 A1    Jul. 12, 2018

Related U.S. Application Data

(60) Provisional application No. 62/444,351, filed on Jan. 9, 2017.

(51) Int. Cl.
*H04B 7/06* (2006.01)
*H04B 7/0413* (2017.01)
*H04B 7/0491* (2017.01)
*H04B 7/08* (2006.01)

(52) U.S. Cl.
CPC ......... *H04B 7/0617* (2013.01); *H04B 7/0413* (2013.01)

(58) Field of Classification Search
CPC combination set(s) only.
See application file for complete search history.

(56) References Cited

U.S. PATENT DOCUMENTS

2011/0064033 A1    3/2011   Gong et al.
2016/0119043 A1*   4/2016   Rajagopal ............. H04B 7/063
                                                          370/329

OTHER PUBLICATIONS

International Search Report and Written Opinion—PCT/US2018/012868—ISA/EPO—dated May 18, 2018.
Oteri K., et al., "Further Details on Multi-Stage, Multi-Resolution Beamforming Training in 802.11ay Date: Nov. 7, 2016 Authors: Name Affiliations Address Phone Email", Nov. 1, 2016 (Nov. 1, 2016), 20 Pages, XP055373215, Retrieved from the Internet: URL: https://mentor.ieee.org/802.11 /dcn/16/11-16-1447-00-00ay-further-details-on-multi-stage-multi-resolutionbeamforming-training-in-802-11ay.pptx.
Oteri K., et al., "Multi-Stage, Multi-Resolution Beamforming Training for 802.11ay Name Affiliations Address Phone Email", Sep. 10, 2016 (Sep. 10, 2016), 12 Pages, XP055373159, Retrieved from the Internet: URL: https://mentor.ieee.org/802.11/dcn/16/11-16-1175-00-00ay-multi-stage-multi-resolution-beamformingtraining-for-802-11ay.pptx.

* cited by examiner

*Primary Examiner* — Ross Varndell
(74) *Attorney, Agent, or Firm* — Steven R. Thiel; Patterson & Sheridan LLP (57) ABSTRACT

Certain aspects of the present disclosure provide methods and apparatus for using wide transmit sector level sweep (SLS) sectors.

8 Claims, 6 Drawing Sheets

FIG. 6

WIDE TRANSMIT SECTOR LEVEL SWEEP (SLS) SECTORS

CLAIM OF PRIORITY UNDER 35 U.S.C. § 119

The present Application for Patent claims benefit of U.S. Provisional Patent Application Ser. No. 62/444,351, filed Jan. 9, 2017, assigned to the assignee hereof and hereby expressly incorporated by reference herein.

BACKGROUND

Field of the Disclosure

Certain aspects of the present disclosure generally relate to wireless communications and, more particularly, to utilizing wide sectors to reduce time for sector level sweep (SLS) procedures used for beamforming training.

Description of Related Art

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate one or more first frames to be output for transmission to a wireless device during a transmit sector sweep using first transmit beamforming sectors that are wider than one or more transmit beamforming sectors to be used for transmitting data frames to the wireless device; and an interface configured to output the first frames for transmission.

Certain aspects of the present disclosure provide an apparatus for wireless communications. The apparatus generally includes a first interface configured to obtain one or more first frames from a wireless device during a transmit sector sweep; and a processing system configured to determine that the one or more first frames were transmitted using first transmit beamforming sectors that are wider than one or more transmit beamforming sectors to be used by the wireless device for transmitting data frames to the apparatus and, in response to the determination, requesting a beam refinement phase (BRP).

Aspects of the present disclosure generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Certain aspects of the present disclosure provide methods and apparatus for performing beamforming training utilizing transmit sector level sweeps (SLS) with wide sectors. The wide sectors may be formed by utilizing antenna elements that might otherwise be disabled when forming relatively narrower beams. Utilizing wider beams, fewer sectors may be used during an SLS, significantly reducing training time.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
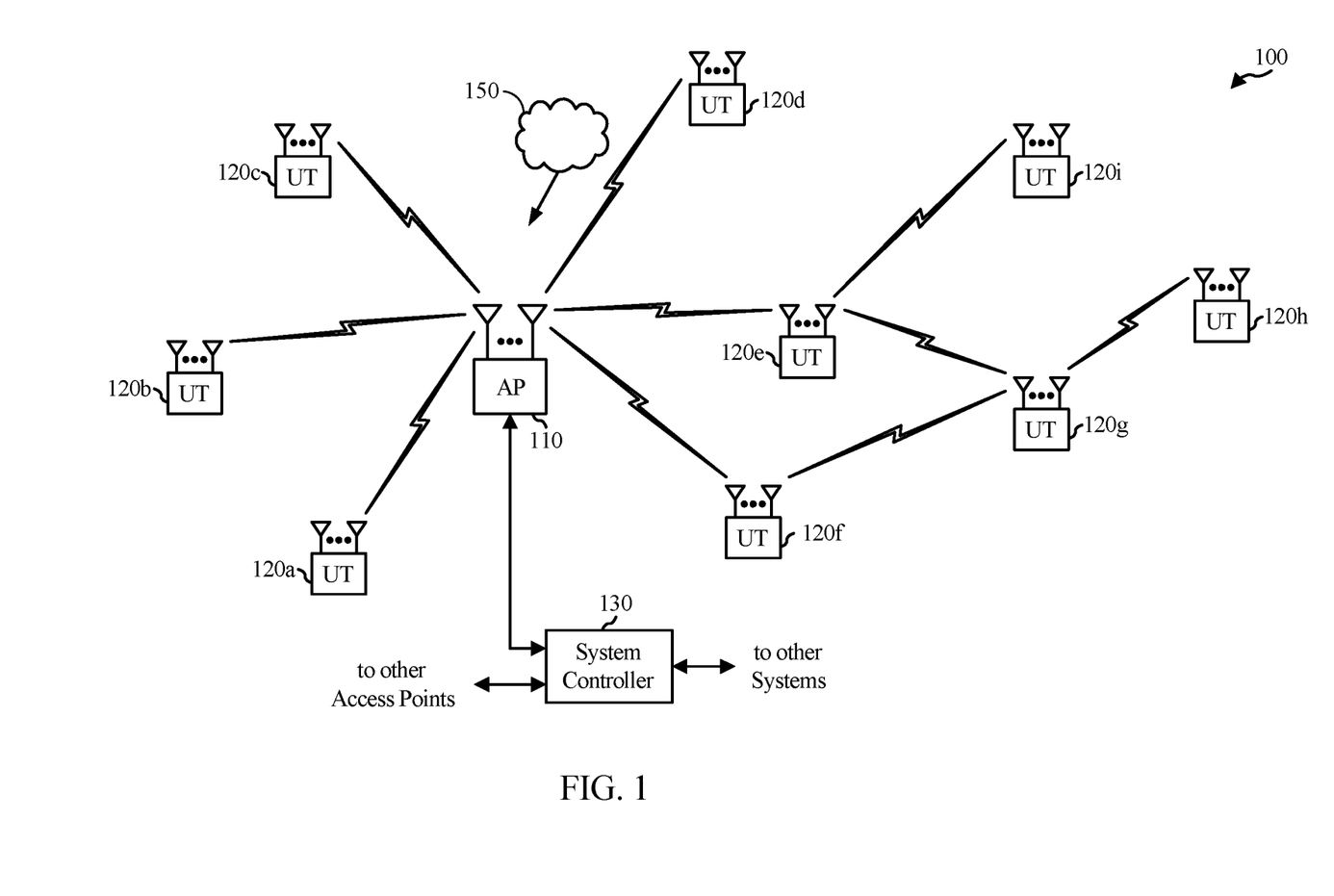
FIG. 1 is a diagram of an example wireless communications network, in accordance with certain aspects of the present disclosure.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
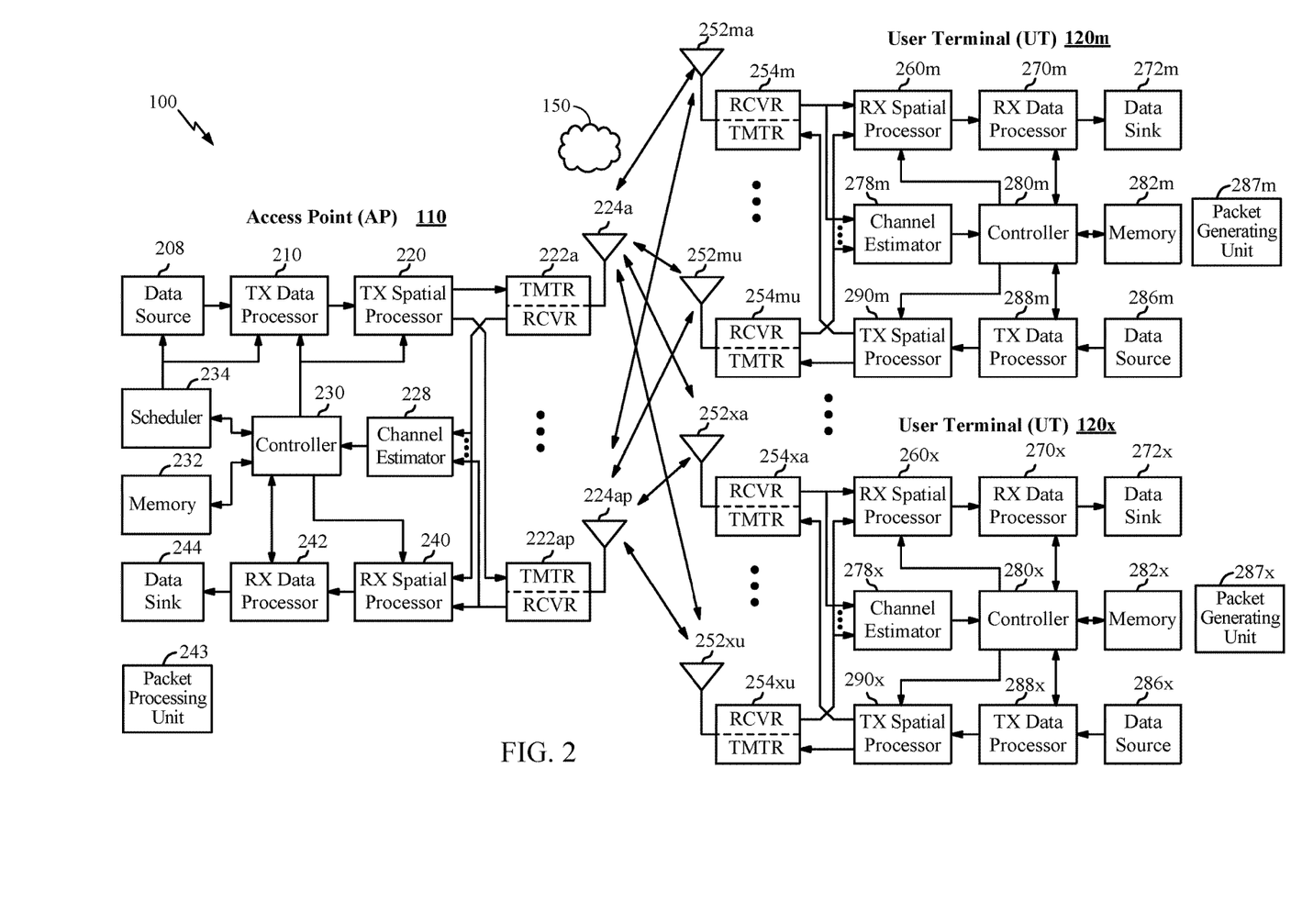
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal. The access point 110 and/or user terminal 120 may have separate transmitter and receiver components or an integrated transceiver (receiver/transmitter) units 222/254, as shown in FIG. 2.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas.

Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more High Efficiency WLAN (HEW) packets 150, with a preamble format as described herein (e.g., in accordance with one of the example formats shown in FIGS. 3A-3B), to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs (e.g., in accordance with one of the example implementations illustrated in FIGS. 10-13, 15, and 16).

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

Example Beamforming Training Procedure

In high frequency (e.g., mmWave) communication systems like 60 GHz (e.g., 802.11ad and 802.11ay), communication is based on beamforming (BF), using directional antennas on both sides for achieving good link. Beamforming (BF) generally refers to a mechanism used by a pair of STAs to adjust transmit and/or receive antenna settings to achieve a link budget for subsequent communication.

Figure 3:
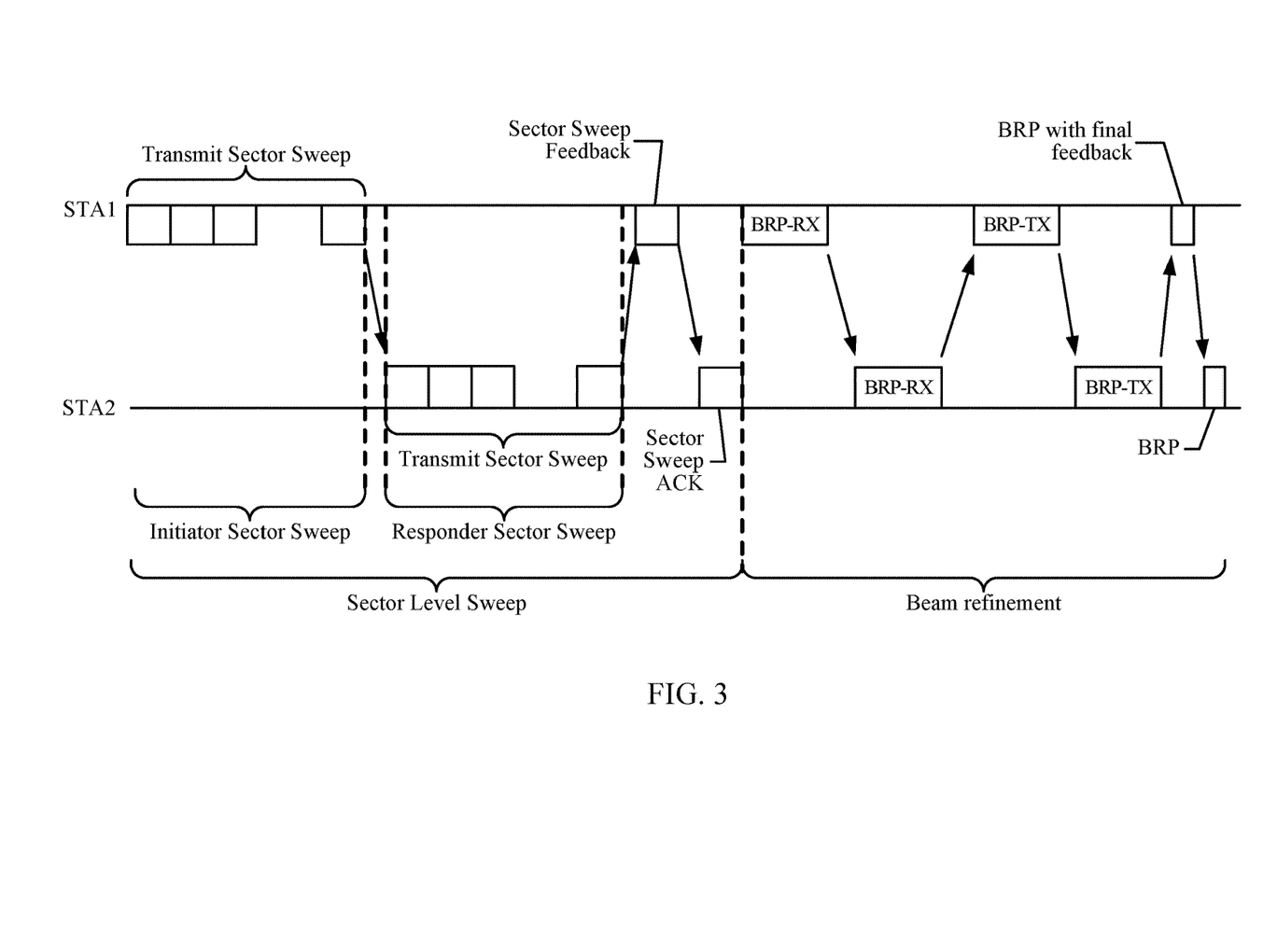
FIG. 3 illustrates an example beamforming training procedure.

As illustrated in FIG. 3, BF training typically involves a bidirectional sequence of BF training frame transmissions between stations (STA1 and STA2 in this example) that uses a sector sweep followed by a beam refining phase (BRP). During the sector sweep, each transmission is sent using a different sector (covering a directional beam of a certain width) identified in the frame and provides the necessary signaling to allow each STA to determine appropriate antenna system settings for both transmission and reception.

As illustrated in FIG. 3, in cases where the AP has large number of elements, the sectors used are relatively narrow, causing the SLS (Sector Level Sweep) process to be long. The higher the directivity, the more sectors that may be used, and therefore the SLS is longer. As an example, an AP with an array of 100 antenna elements may use 100 sectors. This situation is not desired because SLS is an overhead affecting throughput, power consumption, and induces a gap in the transport flow.

Various techniques may be used to try and reduce throughput time. For example, short SSW (SSSW) messages may be used instead of the SSW messages, which may save some time (e.g., about 36%). In some cases, throughput may be reduced by utilizing the fact that in such APs the transmitter may transmit via several RF chains. This facilitates transmission in parallel on several single channels. It may shorten the scan by the factor number of frequencies (2, 3, or 4). However, this approach may involve the receiver supporting scans of the multiple frequencies, and the approach may not be backward compatible with, for example, 802.11ad devices. Further, this approach may involve the stations being fully aware of this special mode in advance. In some cases, the Tx SLS+Rx SLS or the Tx SLS+Rx BRP may be replaced with a new Tx+Rx BRP where only one "very" long BRP msg is used with many TRN units. However, this method may involve a very long message but may be able to support multiple STAs in parallel, making the approach efficient for cases with a large number of STAs.

Aspects of the present disclosure provide a technique utilizing wide Tx SLS sectors. In many use-cases, one station, usually the AP or BTS (NodeB) may have many antenna elements while the other station STA or UE may have many fewer. Such a system topology has an asymmetrical link where the UL (STA→AP) link has less received power than the DL (AP→STA). Due to limited transmit power of non-AP stations, supporting the UL may involve the AP having many more antenna elements than needed in the DL.

Furthermore, due to the multitude of elements and equivalent isotropically radiated power (EIRP) regulatory limits, only a subset of the elements or a lower transmitted power may be used than is achievable in the DL. EIRP generally represents the total effective transmit power of the radio in a particular direction including gains that the antenna elements provide. The gain of an antenna can represent how well the antenna increases effective signal power in a particular direction, with dBi (decibels relative to an isotropic radiator) as the unit of measure. dBi represents the gain of an antenna as compared to an isotropic radiator, which transmits RF signals in all directions equally.

In some cases reducing the number of transmit antennas used by the AP may satisfy EIRP limits. This may be explained by considering a simplified example of an AP with a relatively large array of patch antenna elements placed on the same forward facing plane in a square evenly spaced arrangement. It may be assumed, for this example, that there are 400 elements with a 20×20 layout and that a patch element typically has 4 dBi element gain. It is also reasonable to assume that each element is connected to a PA that may deliver +3 dBm of power.

Hence the array boreside EIRP, in this example, may be computed by:

$$EIRP=+4+3+20 \log 10(NTX)[dBm],$$

where NTX is the number of elements used in transmit mode. If NTX=400 the EIRP may be:

$$EIRP=+4+3+20 \log 10(400)=+4+3+52=+59 \text{ dBm}$$

This is much higher than an FCC allowed +40 dBm value. Hence, in transmit mode the number of elements may be limited to comply with the EIRP limit. For example, the number of elements may be limited to 45, such that:

$$EIRP=+4+3+20 \log 10(45)=+4+3+33=+40 \text{ dBm}.$$

As noted above, the number of sectors to be used by an array may be related to the number of elements used for the beamforming. A rule of thumb that may be used as a guide in one or more cases states that that the number of sectors is (1 . . . 2)×NTX. Meaning that in this example (of a limit to 45 antenna elements) 45 . . . 90 sectors may be used to cover all angular directions.

Example Sector Level Sweep with Wide Sectors

Aspects of the present disclosure, however, may be able to reduce the time used for a SLS by using wider sectors. In effect, the solutions provided herein may take into account that EIRP is measured in a particular direction. Therefore, instead of using relatively narrow BF sectors with high focus, relatively wider beams may be used at least for SLS.

Techniques provided herein generally represent a change to the way the Tx SLS is performed by certain devices, such as an 802.11ay enhanced directional Multi-Gigabit (EDMG) AP or other type station with a relatively large number of transmit antenna elements. As will be described herein, the change may be implemented in a manner that maintains backward compatibility (e.g., with 802.11 lad directional Multi-Gigabit (DMG) stations, while significantly reducing the Tx SLS time and may be used in conjunction with other methods.

The use of wider Tx SLS beams may be based on the fact that the excess Tx elements may be used to build wider sectors. Because EIRP measurements are directional, wider sectors may keep the EIRP within the limits, while reducing the overall number of sectors. Regarding backward-compatibility, DMG devices may use these wide sectors as is or refine it by BRP Tx.

Figure 4:
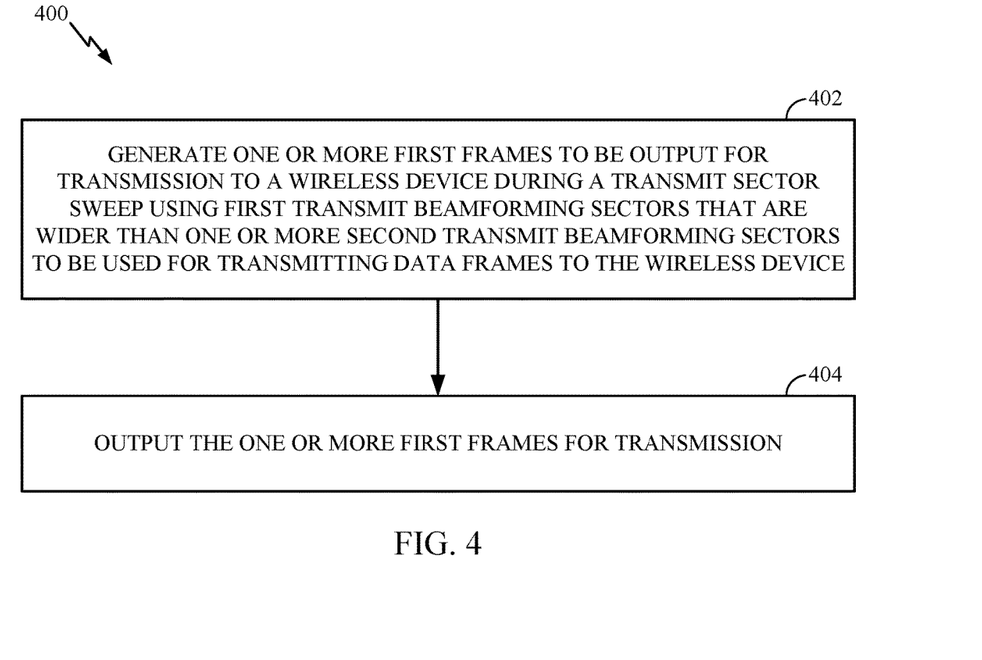
FIG. 4 illustrates example operations for performing a transmit sector level sweep with wide sectors, in accordance with certain aspects of the present disclosure.

FIG. 4 illustrates example operations 400 for performing Tx SLS with wide sectors, in accordance with certain aspects of the present disclosure. The operations, for example, may be performed by an AP or BS with a relatively large number of Tx transmit antennas.

The operations 400 begin, at 402, by generating one or more first frames to be output for transmission to a wireless device during a transmit sector sweep using first transmit beamforming sectors that are wider than one or more second transmit beamforming sectors to be used for transmitting data frames to the wireless device. At 404, the one or more first frames are output for transmission.

Figure 5:
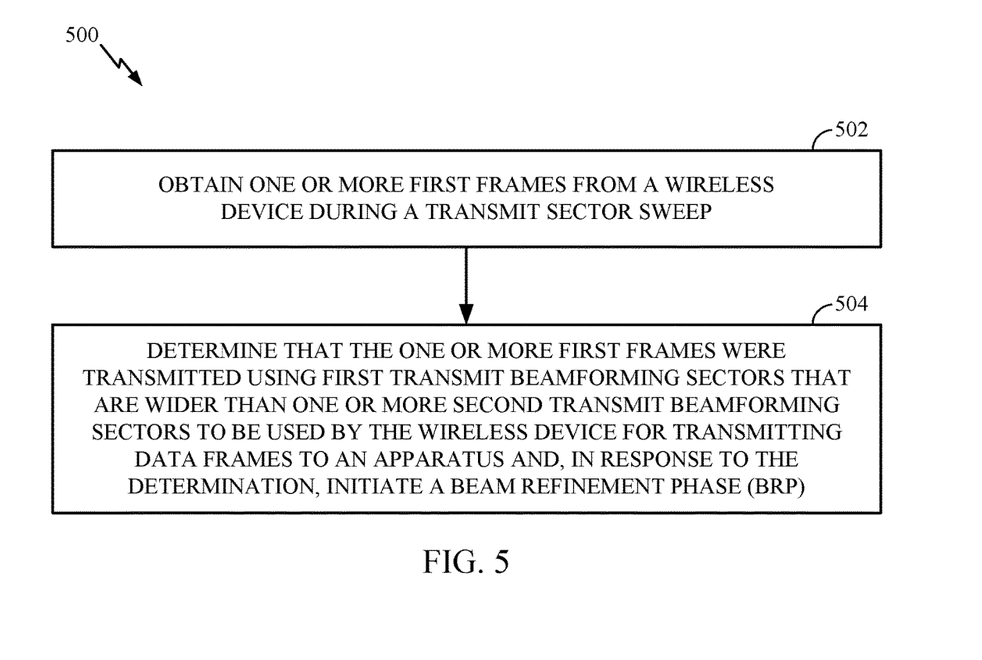
FIG. 5 illustrates example operations for performing beamforming training using a transmit sector level sweep with wide sectors, in accordance with certain aspects of the present disclosure.

FIG. 5 illustrates example operations 500 for performing BF training with a Tx SLS that utilized wide sectors, in accordance with certain aspects of the present disclosure. In other words, the operations may be considered complementary to operations 400.

Operations 500 begin, at 502, by obtaining one or more first frames from a wireless device during a transmit sector sweep. At 504, the station determine that the one or more first frames were transmitted using first transmit beamforming sectors that are wider than one or more transmit beamforming sectors to be used by the wireless device for transmitting data frames to an apparatus and, in response to the determination, initiate (in some cases, request) a beam refinement phase (BRP).

In one or more cases, the techniques may utilize a two-phase approach, performing SLS using wider sectors, then performing beam refinement within the wider sector. Certain devices (e.g., EDMG stations) may be able to perform BRP Tx or refine the Tx sector by using the EDMG modified BRP methods. For example, a multiple sector ID (MID) may be used to test all candidate narrow sectors that overlap with the wide sector, by a refined Tx SLS using SSW or SSSW messages.

The MID may be used to test all candidate narrow sectors that overlap with the wide one, by using one BRP frame with Tx-TRNs (training fields) switching the narrow Tx Sectors antenna weight vector (AWV).

As noted above, the techniques presented herein may be applied in different scenarios (e.g., based on service needs). For example, when MIMO BF is used, the Tx SLS with wide sectors may be used as a first step without refining the sectors. The wide sector sweep may be performed to achieve a rough estimate, while beam refinement may be performed to estimate which sectors (in plural) to take for the MIMO communications.

In some cases, the fact that wider beams are used may be signaled (e.g., to prompt a receiving station to perform a beam refinement. Because the SSW and especially the SSSW messages may not have any spare bits to signal the use of wide sectors, in some cases, the SLS Feedback and/or SLS Feedback Ack messages may be used for this signaling. In other words, these messages may have spare bits and may be extended. This method may allow the SSW and SSSW messages to stay as short as possible, because the SSW and SSSW messages impact the Tx SLS duration.

Figure 6:
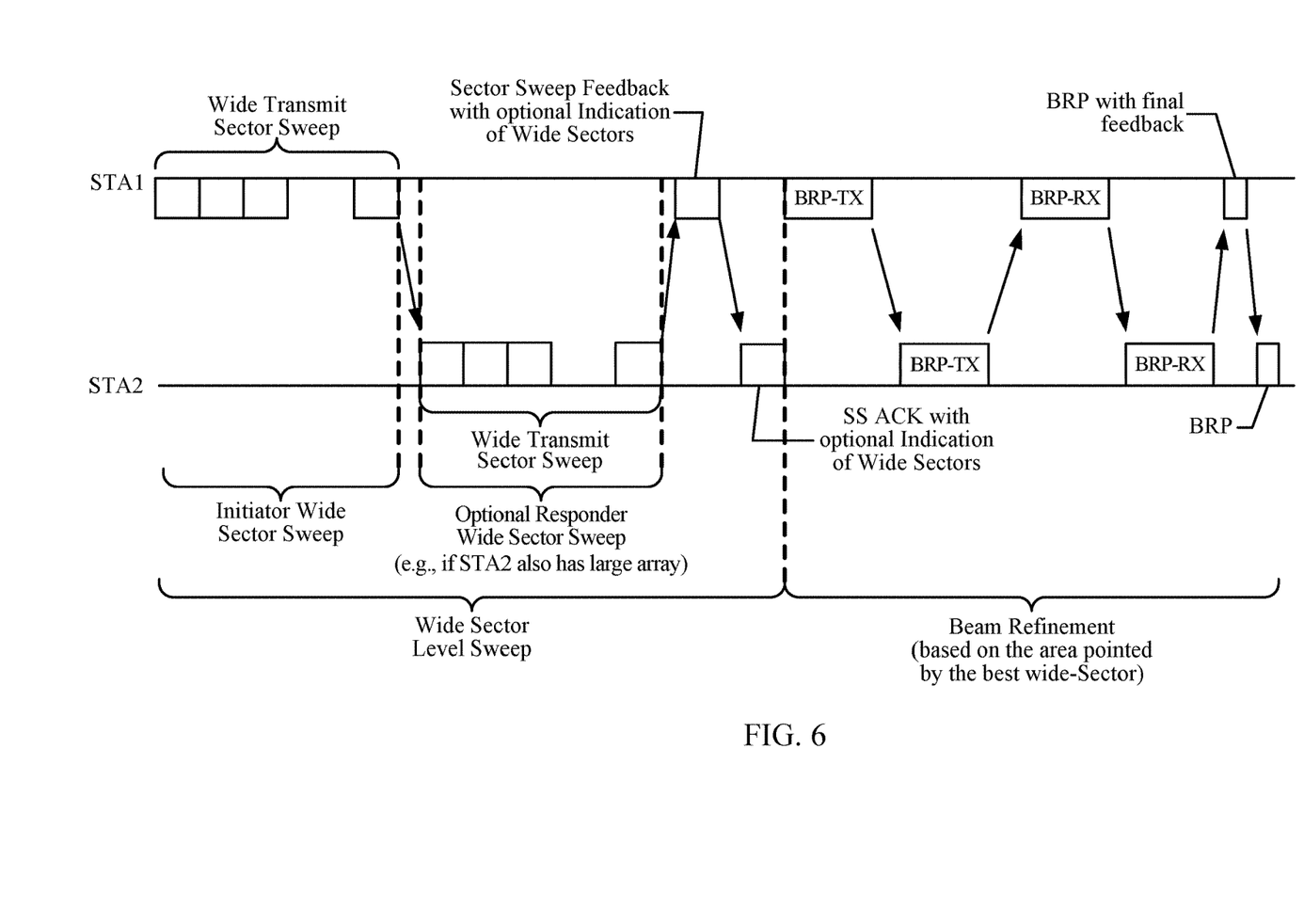
FIG. 6 illustrates an example beamforming training procedure using a transmit sector level sweep with wide sectors, in accordance with certain aspects of the present disclosure.

FIG. 6 illustrates an example beamforming training procedure using a transmit sector level sweep with wide sectors, in accordance with certain aspects of the present disclosure. Wide beam Tx SLS by STA2 is shown as optional because, in many cases, only one STA may perform Tx SLS with wide beams (e.g., as in an AP to STA). In some cases, however, both stations may have a relatively large number of antenna elements (e.g., as in the case of backhaul communications between APs).

As illustrated, an indication of wide beams may optimally be provided along with a sector sweep feedback and a sector sweep acknowledgement (Ack). These may be grouped together and referred to as, for example, a sector sweet feedback frame. Providing the indication along in this manner may be provided if STA2 (is to select and) uses wide beam Tx SLS sectors. In some cases, even without indicating the use of wide sectors, the technique may still work well. For example, the technique may work because a transmit beam refinement phase (BRP-TX) may be subsequently performed.

Figure 4A:
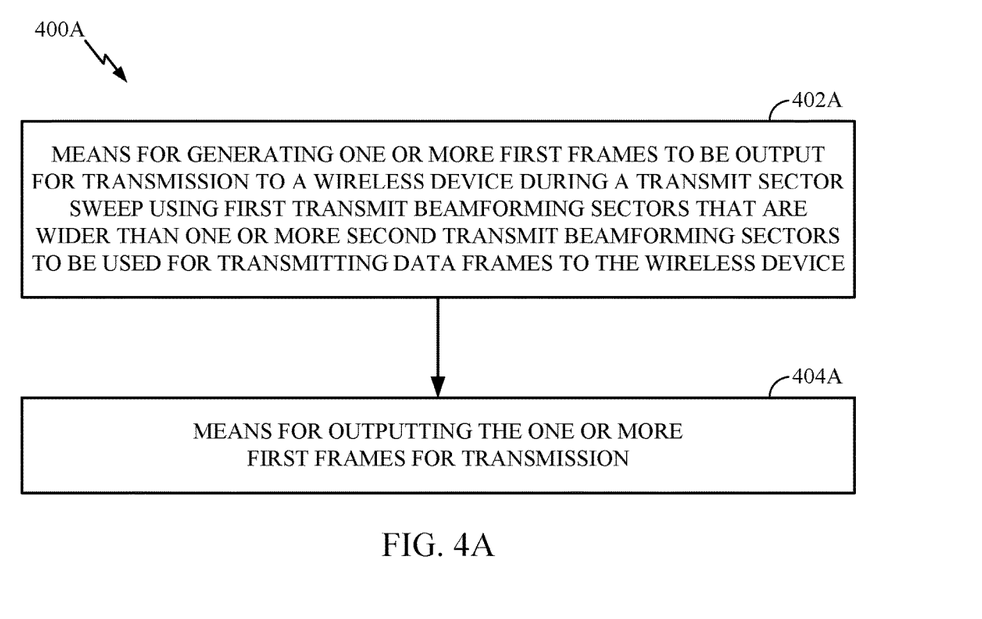
FIG. 4A illustrates example components capable of performing the operations shown in FIG. 4.
Figure 5A:
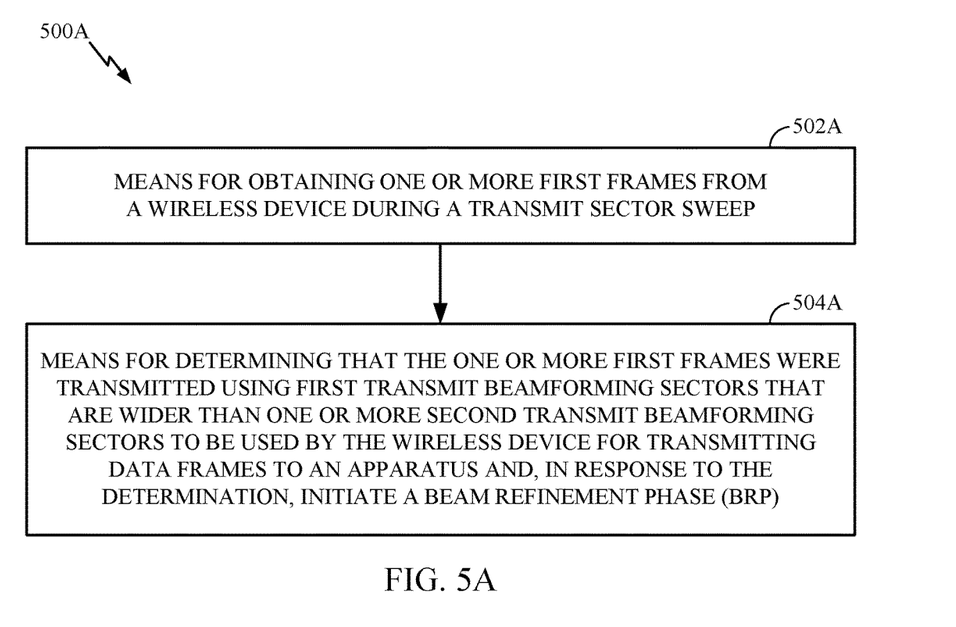
FIG. 5A illustrates example components capable of performing the operations shown in FIG. 5.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 correspond to means 400A illustrated in FIG. 4A while operations 500 illustrated in FIG. 5 correspond to means 500A illustrated in FIG. 5A.

For example, means for transmitting (or means for outputting for transmission) may comprise a transmitter (e.g., the transmitter unit 222) and/or an antenna(s) 224 of the access point 110 or the transmitter unit 254 and/or antenna (s) 252 of the user terminal 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for obtaining, means for generating, means for selecting, means for decoding, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, an interface to output a frame for transmission and an interface for obtaining a frame may be integrated as a single interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:

a processing system configured to generate one or more first frames to be output for transmission to a wireless device during a transmit sector sweep using first transmit beamforming sectors that are wider than one or more second transmit beamforming sectors to be used for transmitting data frames to the wireless device, wherein the processing system is further configured to generate an indication that the first transmit beamforming sectors are wider than the second transmit beamforming sectors;

a first interface configured to output the one or more first frames for transmission using the first transmit beamforming sectors, wherein the first interface is configured to output the indication for transmission; and a second interface configured to obtain an indication, from the wireless device, of at least one of the first transmit beamforming sectors, wherein:

the processing system is further configured to generate one or more second frames to be output for transmission to the wireless device during a transmit beam refinement phase (BRP-TX) using one or more of the second transmit beamforming sectors that overlap with the indicated first transmit beamforming sector;

the first interface is further configured to output the one or more second frames for transmission using the one or more of the second transmit beamforming sectors;

the second interface is further configured to obtain, from the wireless device, an indication of one of the second transmit beamforming sectors;

the processing system is further configured to generate one or more data frames to be output for transmission to the wireless device using the indicated second transmit beamforming sector; and the first interface is further configured to output the data frames for transmission using the indicated second transmit beamforming sector.

2. The apparatus of claim 1, wherein:
the processing system is configured to generate a sector sweep feedback frame with the indication therein; and
the first interface is configured to output the sector sweep feedback frame for transmission.

3. The apparatus of claim 1, wherein the processing system is further configured to perform the transmit sector sweep using the first transmit beamforming sectors for only certain wireless devices based on service needs.

4. The apparatus of claim 1, further comprising at least one antenna via which the one or more first frames are output for transmission, wherein the apparatus is configured as a wireless station.

5. An apparatus for wireless communications, comprising:
a first interface configured to obtain one or more first frames from a wireless device during a transmit sector sweep;
a processing system configured to determine that the one or more first frames were transmitted using first transmit beamforming sectors that are wider than one or more second transmit beamforming sectors to be used by the wireless device for transmitting data frames to the apparatus and, in response to the determination, initiate a beam refinement phase (BRP); and a second interface configured to output for transmission, to the wireless device, an indication of at least one of the first transmit beamforming sectors, wherein:

the first interface is further configured to obtain one or more second frames from the wireless device during a transmit beam refinement phase (BRP-TX), wherein the one or more second frames were transmitted by the wireless device using one or more of the second transmit beamforming sectors that overlap with the indicated first transmit beamforming sector;

the processing system is further configured to select one of the one or more of the second transmit beamforming sectors;

the second interface is configured to output for transmission, to the wireless device, an indication of the selected second transmit beamforming sector; and the first interface is further configured to obtain one or more data frames from the wireless device, the one or more data frames being transmitted by the wireless device using the indicated second transmit beamforming sector.

6. The apparatus of claim 5, wherein:
the first interface is configured to obtain, from the wireless device, an indication that the first transmit beamforming sectors are wider than the one or more second transmit beamforming sectors; and
the determination is based on the indication.

7. The apparatus of claim 6, wherein the first interface is further configured to obtain, from the wireless device, a sector sweep feedback frame having the indication therein.

8. A wireless station, comprising:
a receiver configured to receive one or more first frames from a wireless device during a transmit sector sweep;
a processing system configured to determine that the one or more first frames were transmitted using first transmit beamforming sectors that are wider than one or more second transmit beamforming sectors to be used by the wireless device for transmitting data frames to the wireless station and, in response to the determination, initiate a beam refinement phase (BRP); and
a transmitter configured to transmit, to the wireless device, an indication of at least one of the first transmit beamforming sectors, wherein:

the receiver is further configured to receive one or more second frames from the wireless device during a transmit beam refinement phase (BRP-TX), wherein the one or more second frames were transmitted by the wireless device using one or more of the second transmit beamforming sectors that overlap with the indicated first transmit beamforming sector;

the processing system is further configured to select one of the one or more of the second transmit beamforming sectors;

the transmitter is further configured to transmit, to the wireless device, an indication of the selected second transmit beamforming sector; and the receiver is further configured to receive one or more data frames from the wireless device, the one or more data frames being transmitted by the wireless device using the indicated second transmit beamforming sector.

* * * * *